United States Patent
Frenzer et al.

(10) Patent No.: US 8,954,012 B2
(45) Date of Patent: Feb. 10, 2015

(54) REDUCTION OF MAGNETIC FIELD NOISE VIA MANAGEMENT OF CURRENT DRAW FROM A POWER SOURCE

(75) Inventors: Michael W. Frenzer, Palatine, IL (US); Robert A. Zurek, Antioch, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 196 days.

(21) Appl. No.: 13/447,331

(22) Filed: Apr. 16, 2012

(65) Prior Publication Data

US 2013/0273862 A1   Oct. 17, 2013

(51) Int. Cl.
*H04B 1/38* (2006.01)

(52) U.S. Cl.
USPC ................................. 455/67.11; 455/572

(58) Field of Classification Search
USPC ............ 455/414.1, 414.2, 414.3, 63.1, 67.11, 455/550.1, 569.1, 573, 574, 343.1, 572; 379/51
See application file for complete search history.

(56) References Cited

U.S. PATENT DOCUMENTS

| | | | |
|---|---|---|---|
| 5,819,162 A | 10/1998 | Spann et al. | |
| 6,009,311 A | 12/1999 | Killion et al. | |
| 6,122,500 A * | 9/2000 | Dent et al. | 455/414.1 |
| 6,587,568 B1 | 7/2003 | Sigwanz | |
| 6,639,564 B2 | 10/2003 | Johnson | |
| 7,397,926 B1 | 7/2008 | Frerking | |
| 7,773,943 B2 | 8/2010 | Zurek | |
| 7,962,099 B2 * | 6/2011 | Griffin | 455/63.1 |
| 8,606,333 B2 * | 12/2013 | Frerking et al. | 455/569.1 |
| 2001/0055386 A1 | 12/2001 | Waldron et al. | |
| 2003/0045283 A1 | 3/2003 | Hagedoorn | |
| 2006/0025172 A1 | 2/2006 | Hawker et al. | |
| 2006/0153343 A1 | 7/2006 | Yamazaki et al. | |
| 2007/0003088 A1 | 1/2007 | Lehtola | |
| 2007/0036373 A1 | 2/2007 | Townsend et al. | |
| 2007/0116308 A1 | 5/2007 | Zurek et al. | |
| 2007/0255435 A1 | 11/2007 | Cohen et al. | |
| 2011/0014515 A1 | 1/2011 | Boda et al. | |
| 2011/0014942 A1 | 1/2011 | Van Schyndel et al. | |

FOREIGN PATENT DOCUMENTS

| | | |
|---|---|---|
| EP | 2276090 A1 | 1/2011 |
| WO | 2011006233 A1 | 1/2011 |

OTHER PUBLICATIONS

Rosu, Christian: "How to Reduce RF Emissions", ELI: EMC Lab Info, EMC Design Guideline, Sep. 2009, http://www.emclabinfo.com/emclab/portal/content/files/quote/EMC_how_to_reduce_RF_emissions.pdf, all pages.

(Continued)

*Primary Examiner* — Thanh Le
(74) *Attorney, Agent, or Firm* — Morris & Kamlay LLP

(57) ABSTRACT

Identifying an operation mode of a communication device in which the communication device is to comply with an interference requirement. In response to identifying the operation mode of the communication device in which the communication device is to comply with the interference requirement, reducing noise generated by the communication device by selectively increasing a root mean square (RMS) value of a time-varying current generated by a power source of the communication device.

20 Claims, 4 Drawing Sheets

(56) References Cited

OTHER PUBLICATIONS

American National Standard Methods of Measurement of Compatibility between Wireless Communications Devices and Hearing Aids, Accredited Standards CommitteeC63—Electromagnetic Compatibility accredited by the American National Standards Institute, C63.19, Approved Apr. 14, 2011, pp. 40-50 and 75-77.

Patent Cooperation Treaty, "PCT Search Report and Written Opinion of the International Searching Authority" for International Application No. PCT/US2013/036757 dated Jun. 20, 2013, 9 pages.

* cited by examiner

REDUCTION OF MAGNETIC FIELD NOISE VIA MANAGEMENT OF CURRENT DRAW FROM A POWER SOURCE

BACKGROUND

The present arrangements generally relate to communication devices. In the United States, the Federal Communications Commission (FCC) regulates the compatibility between mobile communication devices, such as mobile telephones, and telecoil equipped hearing aids. This regulation generally is referred to as hearing aid compatibility (HAC).

To enable communications between a communication device and a hearing aid, the hearing aid sometimes includes a telecoil. A telecoil typically is implemented as an audio induction loop, such as a coil of wire, and may include a ferromagnetic core. The hearing aid telecoil is configured to detect a magnetic field containing audio signals generated by a loudspeaker voice coil or a telecoil of the communication device. More particularly, the hearing aid telecoil detects the energy of the magnetic field emanated by the communication device's loudspeaker voice coil or telecoil and transduces the energy to an electrical signal that is coupled to the hearing aid's output audio transducer.

DETAILED DESCRIPTION

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are considered examples of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

Extraneous magnetic fields produced by a communication device can introduce noise into the magnetic field signal generated by the communication device's voice coil or telecoil, which can degrade the quality of audio signals communicated via the magnetic field, thus degrading the quality of audio signals received by, and output by, the hearing aid. Accordingly, the FCC has promulgated specifications related to the signal-to-noise ratio (SNR) of magnetic fields generated by a mobile communication device.

Arrangements described herein relate to reducing noise generated by a communication device by selectively increasing a root mean square (RMS) value of a time-varying current generated by a power source of the communication device. Accordingly, the present arrangements provide means of ensuring that the communication device complies with an applicable interference requirement, while still providing the energy needed by the communication device to operate in its intended manner. The interference requirement can be a baseband interference requirement, such as a hearing aid compatibility (HAC) requirement.

Figure 1:
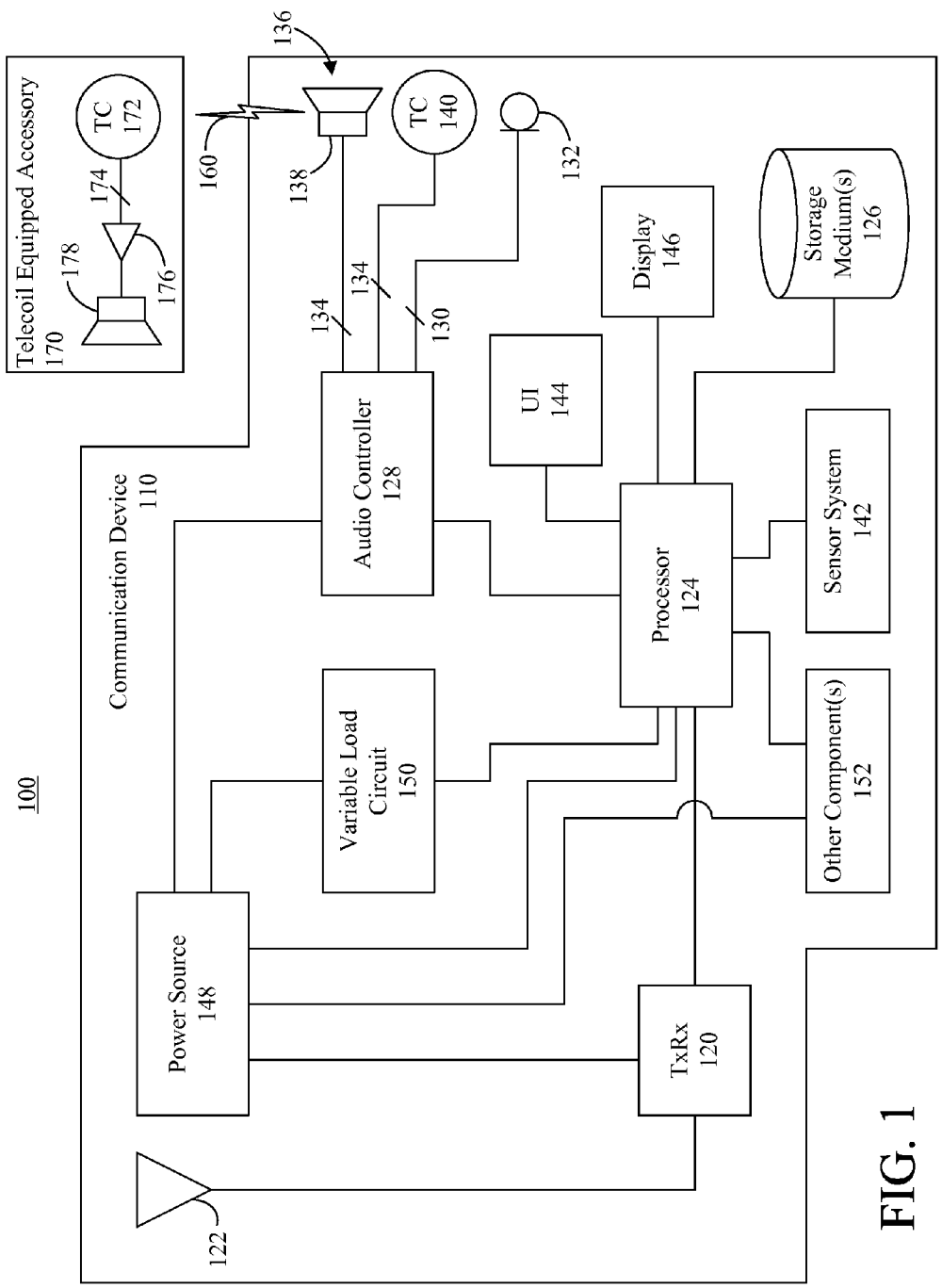
FIG. 1 depicts a block diagram of a system that is useful for understanding various arrangements described herein.

FIG. 1 depicts a block diagram of a system 100 that is useful for understanding the various arrangements described herein. The system 100 can include a communication device 110 and a telecoil equipped accessory 170 (hereinafter "accessory"), for example a hearing aid.

The communication device 110 can be a mobile communication device, such as a mobile telephone, a smart phone, a personal digital assistant, a mobile radio, a mobile computer, a tablet computer, a mobile terminal, an application specific device, a wearable computing/communication device, or any other mobile device that can transmit and/or receive wireless communication signals.

In this regard, the communication device 110 can include a transceiver 120. The transceiver 120 can modulate and demodulate signals to convert signals from one form to another, and can transmit and/or receive such signals over one or more various wireless communication networks. In illustration, the transceiver 120 can communicate data via 2G, 3G, 4G, GSM, LTE, GPRS, EUTRAN, TDMA, CDMA, WCDMA, UMTS, TD-SCDMA, HSPA+, direct wireless communication, etc. Further, the transceiver 120 may be embodied as a wireless network adapter configured to communicate data via IEEE 802 wireless communications, for example, 802.11 and 802.16 (WiMax), mobile WiMax, WPA, or WPA2. Still, the presented embodiments are not limited to these examples and the transceiver 120 can be configured to communicate RF signals in accordance with any suitable communications standards, protocols, and/or architectures, or a suitable combination of such standards, protocols, and/or architectures. The transceiver 120 can be coupled to a suitable antenna 122 to facilitate transmission and reception of RF signals by the transceiver 120.

The communication device 110 also can include a processor 124, which may comprise, for example, one or more central processing units (CPUs), one or more digital signal processors (DSPs), one or more applications processors (APs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein. The processor 124 can be communicatively linked to the transceiver 120, as well as various other components of the communication device 110, for example via one or more system buses, direction communication links, and/or any other suitable communication links.

The communication device 110 also can include one or more computer-usable or computer-readable storage mediums 126 communicatively linked to the processor 124 and having computer-readable program code embodied, e.g., stored, thereon. Any combination of one or more computer-readable storage medium(s) 126 may be utilized. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid state drive (SSD), a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a magneto-optical storage device, or any suitable combination of the foregoing. In the context of this document, a computer-readable storage medium may be any tangible, non-transitory, storage device that can contain, or store, a program or data for use by or in connection with an instruction execution system, apparatus, or device, such as the processor 124.

Program code embodied on a computer-readable or computer-usable storage medium may be communicated using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like, assembly languages, and conventional procedural programming languages, such as the "C" programming language or similar programming languages.

The communication device 110 also can include an audio controller 128 communicatively linked to the processor 124 via a suitable communication link or alternatively embodied within the processor 124. The audio controller 128 can receive an input audio signal 130 from an input audio transducer 132, process the input audio signal 130 into a format recognizeable by the processor 124 (e.g., convert the input audio signal 130 from an analog audio signal to a digital audio signal), and communicate the input audio signal 130 to the processor 124 for further processing.

The audio controller 128 also can receive an output audio signal 134 from the processor 124, process the output audio signal 134 into a format into which the output audio signal 134 can be output by an output audio transducer 136 and/or the telecoil 140 (e.g., convert the output audio signal 134 from a digital audio signal to an analog audio signal), and communicate the output audio signal 134 to the output audio transducer 136 and/or a telecoil 140. In illustration, the audio controller 128 can include an analog-to-digital (A/D) converter, a digital-to-analog (D/A) converter, one or more audio amplifiers, and/or other components suitable for processing audio signals.

The output audio transducer 136 can be a loudspeaker within the communication device 110 that is configured for use in speakerphone operation, an earpiece speaker (also known as a "receiver") of the communication device 110, or any other output audio transducer communicatively linked to the audio controller 128. The output audio transducer 136 can include a voice coil 138, which can form an induction loop, as is well known in the art. The telecoil 140 can also include an induction loop, such as a coil of wire, and may include a ferromagnetic core, though this need not be the case. In one arrangement, when the output audio signal 134 is communicated to the output audio transducer 136, the voice coil 138 of the output audio transducer 136 can generate a magnetic field 160 corresponding to the output audio signal 134, which can be detected by a telecoil 172 of the accessory 170 to generate a corresponding audio signal 174. In another arrangement, the communication device 110 can communicate the output audio signal 134 to the telecoil 140, and the telecoil 140 can generate the magnetic field 160 corresponding to the output audio signal 134, which can be detected by a telecoil 172 of the accessory 170 to generate a corresponding audio signal 174.

Regardless of whether the magnetic field 160 is generated by the voice coil 138 or the telecoil 140, the magnetic field 160 can communicate the output audio signal 134 to the telecoil 172. Extraneous magnetic fields produced by the communication device 110 can introduce noise into the magnetic field 160 generated by the voice coil 138 or telecoil 140, which can degrade the quality of audio signals communicated via the magnetic field 160, thus degrading the quality of audio signals received by, and output by, the accessory 170.

The accessory 170 can include an amplifier 176 that amplifies the audio signal 174 and communicates the audio signal 174 to an output audio transducer 178. The output audio transducer 178 can be positioned proximate to an ear drum of a user. In illustration, the accessory 170 can be configured to fit within an ear of the user, and the output audio transducer 178 configured such that the output audio transducer 178 is positioned within the user's ear proximate to the user's ear drum. Nonetheless, the present arrangements are not limited in this regard. For instance, the output audio transducer 178 can positioned within the user's ear proximate to the user's ear drum, while other components of the accessory 170 are external to the user's ear, for example behind a user's ear. For instance, the output audio transducer 178 can be connected to the accessory 170 via one or more wires or via a wireless communication link.

In one aspect, the audio controller 128 can be configured to selectively communicate the output audio signal 134 to the output audio transducer 136 or the telecoil 140. For example, the communication device 110 can include a sensor system 142 comprising a sensor that detects whether the accessory 170 is proximate to the communication device 110 and/or whether telecoil functionality of the accessory 170 is enabled. When the accessory 170 is proximate to the communication device, and/or telecoil functionality of the accessory 170 is enabled, the audio controller 128 can communicate the output audio signals 134 to the telecoil 140. Otherwise, the audio controller 128 can communicate the output audio signals 134 to the output audio transducer 136.

In another example, the communication device 110 can include a user configurable setting via which a user selects whether the communication device 110 is to communicate output audio signals 134 to the output audio transducer 136 or to the telecoil 140, or both to the output audio transducer 136 and the telecoil 140. User inputs to configure such setting can be received via a suitable user interface 144. In illustration, the user interface 144 can comprise one or more buttons, switches or soft keys to facilitate such user selection. In one arrangement, the user interface 144 can receive user inputs via a display 146, which can comprise a touch screen configured to receive user inputs.

The communication device 110 also can include a power source 148 that provides power to various components of the communication device 110. In one arrangement, the power source 148 can comprise a battery. In another arrangement, the power source 148 can include a power supply. The power supply can be integrated into the communication device 110 or implemented as an external accessory, in which case the communication device 110 can include a connector to receive electrical power from the power supply. As well known to those skilled in the art, the communication device 110 can be configured to operate via power provided by the battery when the power supply is not supplying power to the communication device 110, and operate via power provided by the power supply when the power supply is supplying power to the communication device 110.

The communication device 110 also can include a variable load circuit 150. The variable load circuit 150 can be configured to selectively increase a minimum level of a time-varying current generated by (e.g., drawn from) the power source 148, selectively control a rate of change of the time-varying current generated by (e.g., drawn from) the power source 148 and/or selectively control the shape of the time-varying current waveform, for example at the behest of the processor 124, to reduce a ratio of a peak value to RMS value ratio of the time-varying current. By reducing this ratio, the strength of extraneous magnetic fields, generated by the communication device (i.e., magnetic fields not generated by the voice coil 138 or the telecoil 140) can be decreased; thereby reducing interference with a magnetic field 160 generated by the voice coil 138 or the telecoil 140, and thus increasing a SNR of the magnetic field 160.

The variable load circuit 150 can comprise electronic circuitry that consumes and/or stores, at least temporarily, electrical power, and thus draws electrical current from the power source 148. The variable load circuit 150 can include hardware components, software components, or a combination of hardware and software. For example, the variable load circuit 150 can include one or more active devices, such as transistors, operational amplifiers or other integrated circuits which need not execute program code, integrated circuits that execute suitable program code, and/or passive electrical devices, such as capacitors, inductors and/or resistors.

The variable load circuit 150 can be selectively activated, when appropriately determined, by the processor 124 to increase the minimum level of a time-varying current drawn from the power source 148 and/or control the rate of change of the time-varying current generated by the power source 148. In one arrangement, the processor 124 can selectively time activation of the variable load circuit 150 to reduce the ratio of the peak value to the RMS value of the time-varying current as will be described herein.

The communication device 110 can include other components 152 that are configured to perform other functions within the communication device 110. These other components 152 can be selectively controlled by the processor 124 in addition to, or in lieu of, the variable load circuit 150, to increase the minimum level of a time-varying current generated by the power source 148, control a rate of change of the time-varying current generated by the power source 148 and/or control the waveform shape of the time-varying current. These other components 152 can be hardware components, software components, or a combination of hardware and software. Again, the processor 124 can selectively time the use of the other components 152 to reduce the ratio of the peak value to the RMS value of the time-varying current as will be described herein.

In one example, another component 152 can be software excecuted by the processor 124. The amount of energy consumed by processor 124, or any other software controlled devices in the communication device 110, while executing such software can be selectively varied by the processor 124 (or other devices), based on instructions contained in the software, to reduce the ratio of the peak value to the RMS value of the time-varying current drawn from the power source 148. In this case, the other component 152 can be implemented using software that resides on the storage medium(s) 126.

In another example, the other component(s) 152 can be hardware within the communication device 110 that can be controlled by the processor 124 to selectively control the amount of current the hardware draws from the power source 148. Further, software that controls such hardware also can be selectively controlled by the processor 124 to control the amount of current the hardware draws from the power source 148. Examples of such hardware include the transceiver 120, the computer-readable storage medium 126, the audio controller 128, the sensor system 142 and the display 146. Still, any other hardware within the communication device 110 may be controlled in this manner and the present arrangements are not limited in this regard. It should be noted that although the other component(s) 152 are depicted in FIG. 1, it need not be the case that the other component(s) 152 are distinct from components specifically discussed herein. For example, component 152 and the transceiver 120 can be the same component; component 152 and the computer-readable storage medium 126 can be the same component. The audio controller 128 can be the same component as component 152; and the sensor system 142 can be the same component as component 152. Component 152 and the display 146 can be the same component as well.

At this point it should be noted that the communication device 110 may operate in certain communication modes in which the variable load circuit 150 and/or other components 152 are not needed to selectively control the current generated by, or drawn from, the power source 148 in order to comply with a specific interference requirement (e.g., SNR requirements for the magnetic fields generated by the communication device 110 set forth in HAC regulations). In other words, during certain communication modes, the strength of extraneous magnetic fields generated by the communication device 110 may not be high enough to result in a SNR of the magnetic field 160 to warrant implementation of the current control arrangements described herein, though other communication modes may warrant such implementation.

In this regard, the communication device 110 can be configured to determine when noise reduction (e.g., an increase of the SNR of the magnetic field 160) is required and selectively implement one or more noise reduction techniques described herein by controlling the current generated by, or drawn from, the power source 148, and thus selectively reduce the strength of extraneous magnetic fields generated by the communication device 110. For example, the processor 124 can detect which communication mode is presently being, or going to be, implemented by the communication device 110 to communicate via the transceiver 120 and/or the level of transmit power presently being generated by the transceiver 120, or that is going to be generated by the transceiver 120. Based, at least in part, on this/these detection(s), the processor 124 can selectively determine whether to implement processes to reduce noise, for example to increase the SNR of the magnetic field 160.

In an arrangement in which the communication device 110 detects the presence of the accessory 170, for example as previously described, the determination of whether the accessory 170 is present also can be evaluated to determine whether to implement noise reduction. For example, if the communication device 110 detects that the accessory 170 is located proximate to the communication device 110 and the telecoil 172 of the accessory is activated to enable communication with the communication device 110, and/or a telecoil communication mode on the communication device is enabled, the processor 124 can further evaluate whether the communication mode and/or transmit power warrant implementation of the noise reduction. If, however, the accessory is not activated to enable communication with the communication device 110, and/or the telecoil communication mode on the communication device is disabled, the processor 124 can determine that implementation of the noise reduction is not warranted, regardless of the communication mode active on the communication device 110 or the transmit power generated by the transceiver 120.

In illustration, when the communication device 110 is communicating in accordance with a WCDMA communication protocol, extraneous magnetic fields generated by the communication device 110 may not be high enough to result in an unacceptable SNR of the magnetic field 160, and thus implementation of the current control arrangements described herein may not be warranted. However, if the communication device 110 loses WCDMA connectivity, and thus begins communicating in accordance with GSM communication protocol at or near full transmit power, it may be prudent to implement reduction of extraneous magnetic fields to maintain an acceptable SNR of the magnetic field 160. Accordingly, when the processor 124 detects that the communication device 110 is communicating in accordance with GSM at or near full transmit power, the processor 124 then implment the SNR improvement techniques described herein. If, however, the presently required transmit power is below a particular threshold value in which the noise reduction techniques are warranted, the noise reduction techniques need not be implemented.

When the communication device 110 again begins communicating in accordance with a protocol and/or at a transmit power level in which the processes described herein are no longer needed to meet an applicable interference requirement, the processor 124 can cease the noise reduction techniques. In this regard, the processor 124 (e.g., via execution of software or firmware) can determine the current communication mode being used to communicate by the communication device 110 and/or the power transmitted by the communication device 110, and determine whether or not to implement noise reduction. Moreover, the amount that the minimum level of a time-varying current generated by the power source 148 is increased, the control of the rate of change of the time-varying current generated by a power source 148 and/or control of the time-varying current waveform, can be selectively implemented by the processor 124 based on the current communication protocol being implemented by the communication device 110 and/or the power transmitted by the communication device 110.

Figure 2:
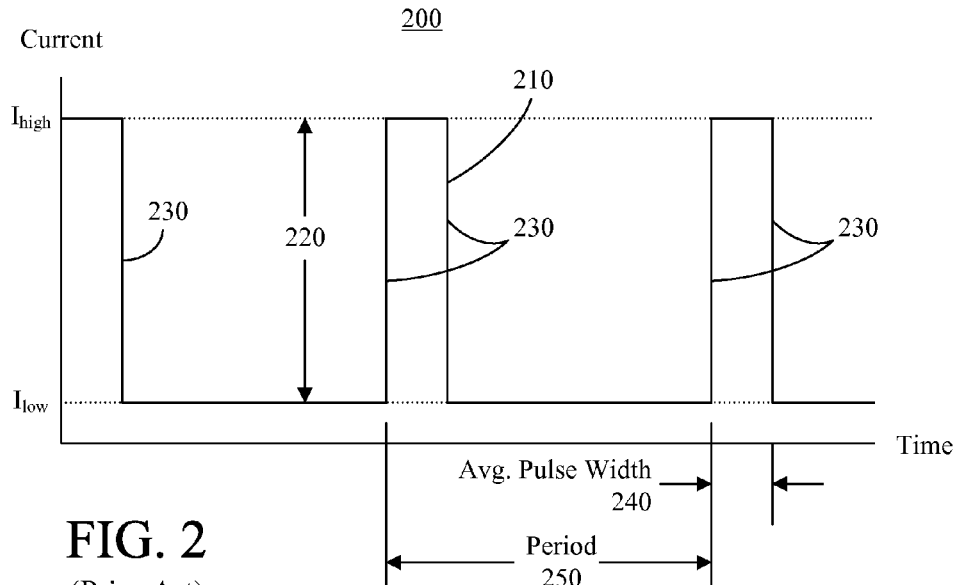
FIG. 2 depicts a graphical plot of a typical power source current waveform of the prior art.

FIG. 2 depicts a graphical plot 200 of a typical power source current waveform 210 of the prior art. In the prior art, a communication device's transceiver may draw current from the communication device's power source in accordance with the current waveform 210. Both the amplitude difference 220 between the maximum current draw ($I_{high}$) and the minimum current draw ($I_{low}$) and the sharp transitions 230 between the maximum current draw and minimum draw can generate extraneous electromagnetic noise, including magnetic field noise in the near field. Such noise correlates to harmonics and sub-harmonics of the current switching cycle due to the average pulse width 240, period 250 and amplitude difference 220 of the power source current waveform 210.

Figure 3:
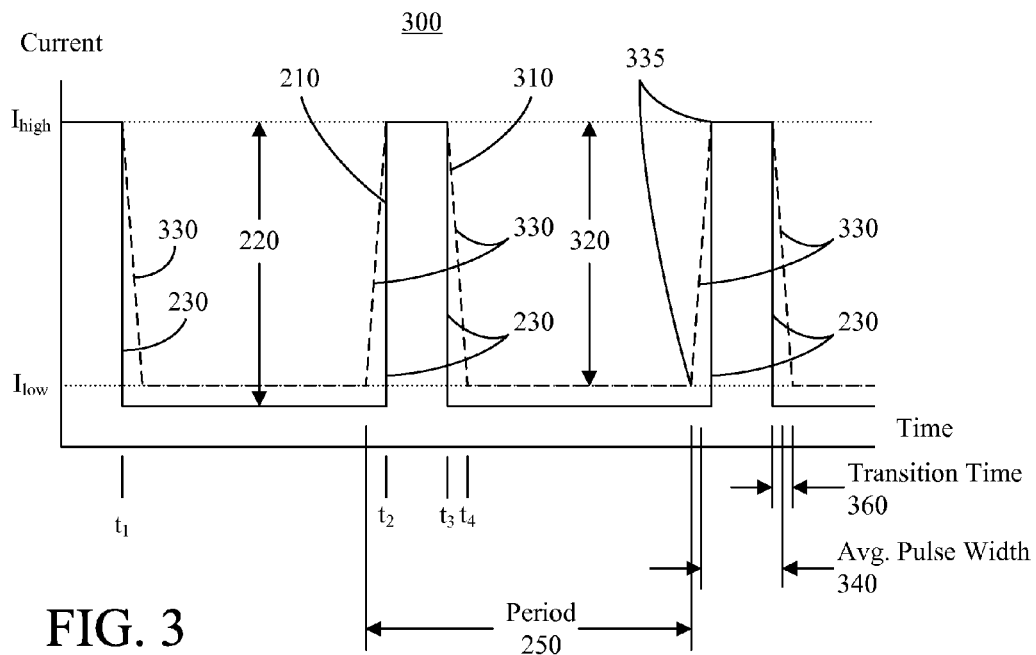
FIG. 3 depicts a graphical plot of a selectively controlled power source current waveform superimposed upon a prior art power source current waveform that is useful for understanding various arrangements described herein.

FIG. 3 depicts a graphical plot 300 of a selectively controlled power source current waveform 310 superimposed upon a prior art power source current waveform 210 that is useful for understanding various arrangements described herein. When the processor determines that noise reduction is prudent, for example to improve the SNR of the magnetic field containing the audio information, the processor can selectively activate the variable load circuit, or other components of the communication device, to reduce the strength of extraneous magnetic fields generated by the communication device due to current being generated by, or drawn from, the power source. Specifically, the variable load circuit or other components can be selectively activated to increase the minimum level of a time-varying current ($I_{low}$) generated by the power source, to introduce/increase an average transition time 360, and thus a rate of change, of the time-varying current, and/or selectively shape the power source current waveform 210 to reduce a ratio of a peak value of the time-varying current to a RMS value of the time-varying current. When increasing the average transition time 360 of the time-varying current, the period 250 can remain the same as the period 250 prior to implmentation of the variable load circuit, though this need not be the case. The transition region 330 can be linear, logarithmic, sinusoidal, or any other transition shape that reduces the harmonic content of the pulsed signal.

By increasing the minimum level of the time-varying current ($I_{low}$) generated by the power source, the amplitude difference 220 between the maximum current draw ($I_{high}$) and the minimum current draw ($I_{low}$) of the current waveform 210 can be reduced to the amplitude difference 320 depicted for the current waveform 310, which reduces the ratio of a peak value to the RMS value of the time-varying current. Specifically, increasing the minimum level of the current waveform generated by the power source, while not increasing the maximum level of the current waveform increases the RMS value of the current waveform generated by the power source, reduces said ratio.

Introducing, or increasing, the transition time 360 of the current waveform at the transitions 330, which decreases a rate of change of the current waveform generated by the power source, increases the average pulse width 340 of the current waveform 310 with respect to the average pulse width 240 of the current waveform 210, which also reduces the ratio of a peak value to the RMS value of the time-varying current. Specifically, increasing the transition time 360 of the current waveform increases the RMS value of the current waveform, which reduces said ratio.

Introducing or increasing the transition time in addition to raising the minimum current draw ($I_{low}$) also reduces the high frequency harmonics of the generated noise which produces a more acceptable noise in addition to the improved SNR. The ANSI C63.19 standard specifies a perceptual weighting filter in a test apparatus to account for this perceptibility of the measured noise. In general, this perception weighting filter attenuates noise at the low and high ends of the human hearing range, which is why a reduction in harmonic content of a low frequency alternating signal results in a lower noise in a HAC measurement and lower perceived noise by a user.

In addition to, or in lieu of, increasing the transition time 360, the shape of the current waveform 310 can be selectively controlled to reduce harmonics generated by the current waveform 310—harmonics can add unwanted noise and degrade the SNR of the magnetic field. For instance, transitions 330 of the current waveform 310 can be selectively shaped to reduce the harmonics. Moreover, the corners 335 of the current waveform 310 can be rounded, which can result in a decrease of the harmonics generated by the current waveform.

The processor can selectively perform time activation of the variable load circuit (or other components) of the communication device 110 to reduce the amplitude difference between the maximum current draw ($I_{high}$) and the minimum current draw ($I_{low}$) of the current waveform. For example, at time $t_1$ the processor can activate the variable load circuit (or other components) to begin drawing current from the power source, and at time $t_2$ the processor can deactive the variable load circuit (or other components) to halt the variable load circuit's draw of current from the power source. Accordingly, use of the variable load circuit (or other components) need not increase the maximum current draw ($I_{high}$) from time $t_2$ to time $t_3$. At time $t_4$ the variable load circuit (or other components) can be reactivated, and so on.

Further, the processor can selectively time activation of the variable load circuit (or other components) of the communication device 110 to introduce/increase the transition time 360 of the current waveform, though this need not be the case. For example, if merely introducing/increasing the transition time 360 and not increasing the minimum current draw ($I_{low}$) of the current waveform, the variable load circuit (or other components) can remain connected to the power source while the SNR improvement is warranted.

Figure 4:
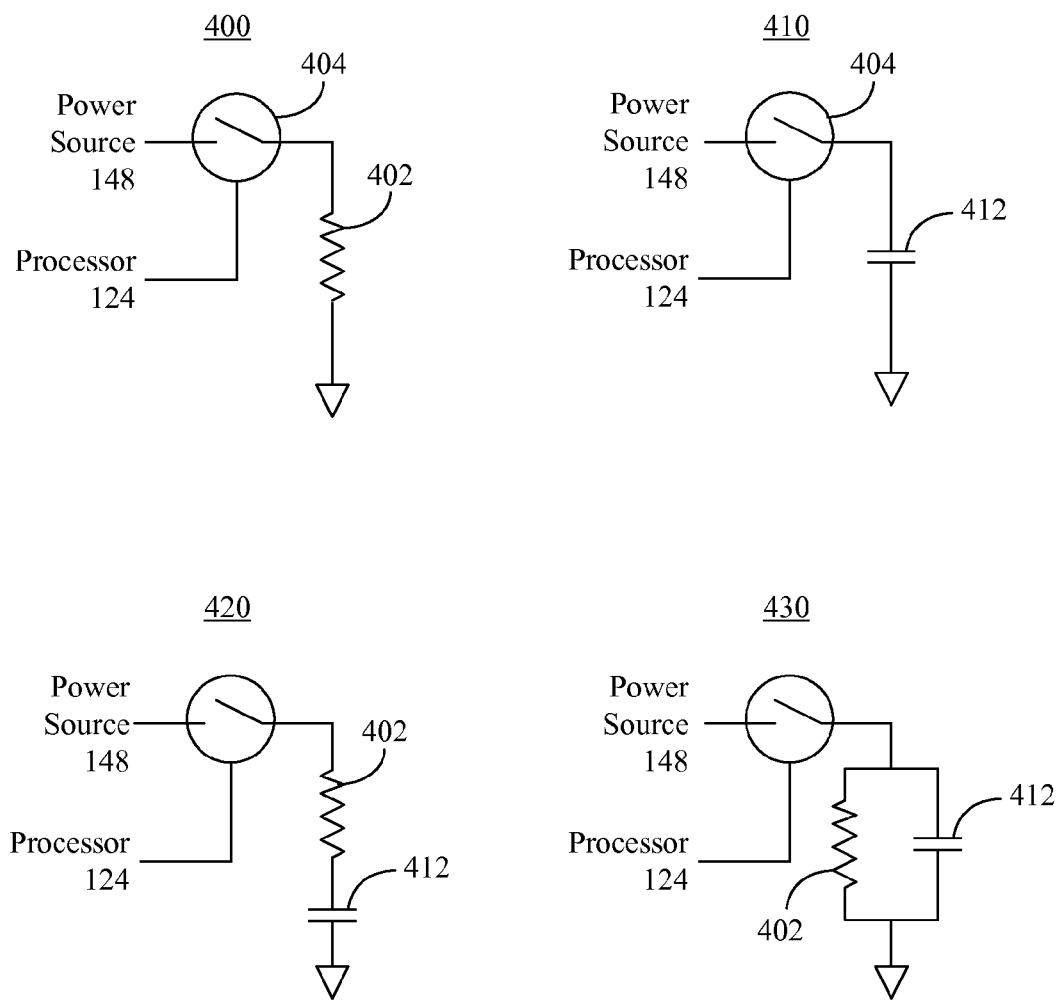
FIG. 4 depicts schematic diagrams of various variable load circuits including passive devices that are useful for understanding various arrangements described herein.

As noted, the variable load circuit of the communication device can include active and/or passive electrical devices configured to selectively draw current form the power source. FIG. 4 depicts schematic diagrams of various variable load circuits ("circuits") 400, 410, 420, 430 including passive devices, which are useful for understanding the present arrangements.

The circuit 400 can include a resistor 402 which can be selectively activated by the processor 124 to draw current from the power source 148 when appropriate, for example via a switch 404, to increase the minimum current draw of the current waveform. The switch 404 can be implemented as an electro-mechanical switch or as an electrical switch comprising active devices, such as one or more transistors, operational amplifiers, integrated circuits, or the like.

The circuit 410 can include a capacitor 412 which can be selectively activated by the processor 124 to draw current from the power source 148 when appropriate, for example via the switch 404, to introduce/increase the transition time of the current waveform, change a shape of the current waveform transitions, and/or to round corners of the current waveform.

The circuit 420 can include resistor 402 and a capacitor 412 which can be selectively activated by the processor 124 to draw current from the power source 148 when appropriate, for example via the switch 404, to introduce/increase the transition time of the current waveform, change a shape of the current waveform transitions, and/or to round corners of the current waveform.

The circuit 430 can include resistor 402 and a capacitor 412 which can be selectively activated by the processor 124 to draw current from the power source 148 when appropriate, for example via the switch 404, to increase the minimum current draw of the current waveform and introduce/increase the transition time of the current waveform, change a shape of the current waveform transitions, and/or to round corners of the current waveform.

The schematics presented in FIG. 4 are mere examples of circuits that can be implemented in the variable load circuit. As noted, the variable load circuit need not include passive electrical devices, and can be implemented exclusively using active circuits. Such active circuits can execute program code to implement variable load circuit functionality, but this need not be the case. For instance, the active circuits need not execute software. As such, the processor 124, itself, can execute suitable program code to determine when to activate and deactivate the active electrical devices, as it also may do to activate and deactivate passive electrical devices.

Figure 5:
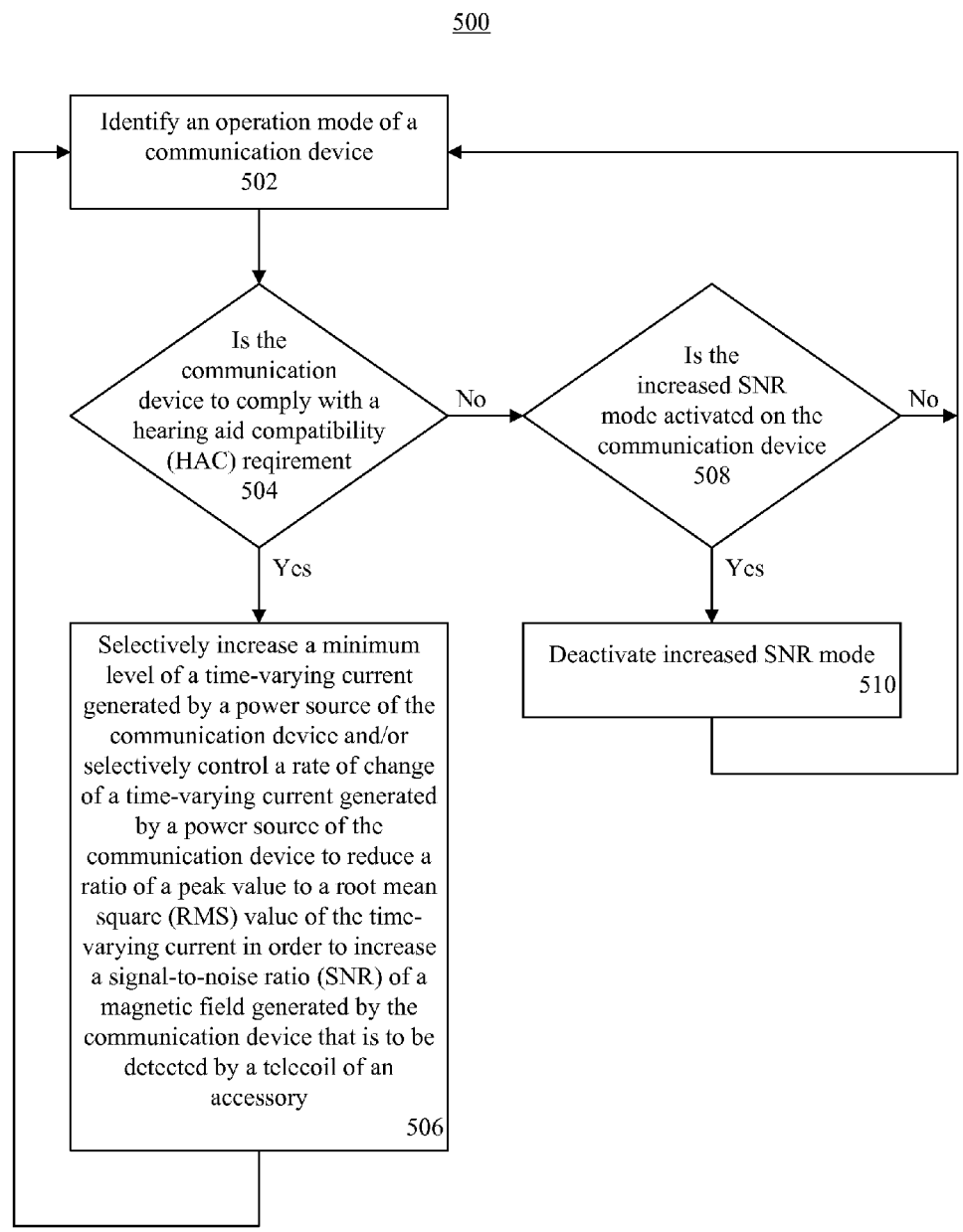
FIG. 5 is a flowchart presenting a method that is useful for understanding various arrangements described herein.

FIG. 5 is a flowchart presenting a method 500 that is useful for understanding various arrangements described herein. At step 502, an operation mode of a communication device can be identified.

Proceeding to decision box 504, a determination can be made as to whether the communication device is to comply with an interference requirement to which the communication device does not presently comply. The interference requirement can be a baseband interference requirement, such as a HAC requirement, though this need not be the case; the interference requirement can be any other interference requirement to which the communication device is to comply. For example, the communication mode and/or transmit power of the communication device can be determined. Further, a determination can be made as to whether a telecoil equipped accessory is proximate to the communication device, whether telecoil communications are activated on the accessory and/or whether telecoil communications are activated on the communication device. Based on one or more of these determinations, a decision can be made as to whether the communication device is to comply with the interference requirement.

If the communication device is to comply with the interference requirement to which it does not presently comply, at step 506 the processor of the communication device can reduce noise generated by the communication device by selectively increasing a root mean square (RMS) value of a time-varying current generated by a power source of the communication device to decrease a ratio of a peak value to RMS value of the time-varying current. The RMS value can be selectively increased by increasing a minimum level of a time-varying current generated by a power source of the communication device, controlling a rate of change of the time-varying current generated by the power source and/or shaping the waveform of the time-varying current. The process then can return to step 502 and can be repeated while the communication device is active.

Referring again to step 504, if it is not required that the communication device comply with the interference requirement, at decision box 508 a determination can be made as to whether the reduced noise mode is activated on the communication device. If so, at step 510 the reduced noise mode can be deactivated. If the reduced noise mode is not activated, the reduced noise mode need not be deactivated. The process then can return to step 502 and can be repeated while the communication device is active.

The flowchart, block diagram and schematic diagrams presented in the figures illustrate the architecture, functionality, and operation of possible implementations of systems, methods and computer program products according to various embodiments described herein. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present embodiments can be realized in hardware, or a combination of hardware and software. The present embodiments can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-readable (or computer-usable) program code that, when being loaded and executed by one or more processors, controls the processing system such that it carries out the methods described herein. The present embodiments also can be embedded in a computer program product comprising a non-transitory computer-readable storage medium, readable by a machine, tangibly embodying a program of instructions executable by the processing system to perform methods and processes described herein. The present embodiments also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a script, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

These embodiments can be embodied in other forms without departing from the spirit or essential attributes thereof. Accordingly, reference should be made to the following claims, rather than to the foregoing specification, as indicating the scope of the embodiments.

What is claimed is:

1. A method comprising:
   via a processor, identifying an operation mode of a communication device in which the communication device is to comply with an interference requirement;
   in response to identifying the operation mode of the communication device in which the communication device is to comply with the interference requirement, reducing noise generated by the communication device by selectively increasing a minimum level of a time-varying current generated by a power source of the communication device to reduce a ratio of a peak value to a root mean square (RMS) value of the time-varying current.

2. The method of claim 1, wherein selectively increasing the minimum level of the time-varying current generated by a power source of the communication device comprises:
   selectively activating a variable load circuit to draw current from the power source.

3. The method of claim 1, wherein selectively increasing the minimum level of the time-varying current generated by a power source of the communication device comprises:
   selectively controlling a component of the communication device to draw current from the power source, wherein the component is configured to perform at least one other function within the communication device.

4. The method of claim 1, further comprising:
   selectively controlling a rate of change of the time-varying current generated by the power source of the communication device to further reduce the ratio of the peak value to the RMS value of the time-varying current, controlling the rate of change of the time-varying current comprising increasing a transition time between the minimum level and the peak value of the time-varying.

5. The method of claim 1, wherein identifying the operation mode of the communication device in which the communication device is to comply with the interference requirement comprises:
   detecting that the communication device is communicating via a transceiver of the communication device in accordance with a particular communication protocol.

6. The method of claim 1, wherein identifying the operation mode of the communication device in which the communication device is to comply with the interference requirement comprises:
   detecting a transmit power of a transceiver of the communication device.

7. The method of claim 1, wherein reducing noise generated by the communication device comprises:
   increasing a signal-to-noise ratio (SNR) of a magnetic field generated by the communication device.

8. The method of claim 1, wherein:
   the interference requirement is a hearing aid compatibility (HAC) requirement; and
   reducing noise generated by the communication device increases a signal-to-noise ratio (SNR) of a magnetic field generated by the communication device that is to be detected by a telecoil of an accessory.

9. A method comprising:
   via a processor, identifying an operation mode of a communication device in which the communication device is to comply with a hearing aid compatibility (HAC) requirement;
   in response to identifying the operation mode of the communication device in which the communication device is to comply with the HAC requirement, reducing noise generated by the communication device by selectively increasing a root mean square (RMS) value of a time-varying current generated by a power source of the communication device to decrease a ratio of a peak value to RMS value of the time-varying current.

10. The method of claim 9, wherein selectively increasing RMS value of a time-varying current generated by the power source of the communication device comprises:
    selectively controlling a rate of change of the time-varying current generated by the power source of the communication device, controlling the rate of change of the time-varying current comprising increasing a transition time between a minimum level and the peak value of the time-varying.

11. The method of claim 9, wherein selectively increasing RMS value of a time-varying current generated by the power source of the communication device comprises:
    selectively increasing a minimum level of a time-varying current generated by a power source of the communication device.

12. The method of claim 9, wherein selectively increasing RMS value of a time-varying current generated by the power source of the communication device comprises:
    selectively activating a variable load circuit to draw current from the power source.

13. The method of claim 9, wherein selectively increasing RMS value of a time-varying current generated by the power source of the communication device comprises:
    selectively controlling a component of the communication device to draw current from the power source, wherein the component is configured to perform at least one other function within the communication device.

14. The method of claim 9, wherein identifying the operation mode of the communication device in which the communication device is to comply with the interference requirement comprises:
   detecting that the communication device is communicating via a transceiver of the communication device in accordance with a particular communication protocol.

15. The method of claim 9, wherein identifying the operation mode of the communication device in which the communication device is to comply with the interference requirement comprises:
   detecting a transmit power of a transceiver of the communication device.

16. The method of claim 9, wherein reducing noise generated by the communication device comprises:
   increasing a signal-to-noise ratio (SNR) of a magnetic field generated by the communication device.

17. The method of claim 9, wherein reducing noise generated by the communication device comprises:
   increasing a signal-to-noise ratio (SNR) of a magnetic field generated by the communication device that is to be detected by a telecoil of an accessory.

18. A communication device comprising:
   a transceiver; and
   a processor configured to:
      identify an operation mode of a communication device in which the communication device is to comply with an interference requirement; and
      in response to identifying the operation mode of the communication device in which the communication device is to comply with the interference requirement, reduce noise generated by the communication device by selectively increasing a minimum level of a time-varying current generated by a power source of the communication device to reduce a ratio of a peak value to a root mean square (RMS) value of the time-varying current.

19. The communication device of claim 18, wherein the processor further is configured to:
   selectively activate a variable load circuit to draw current from the power source to selectively increase the minimum level of the time-varying current and control a rate of change of the time-varying current to further reduce the ratio of the peak value to the RMS value of the time-varying current, controlling the rate of change of the time-varying current comprising increasing a transition time between the minimum level and the peak value of the time-varying.

20. The communication device of claim 18, wherein the processor further is configured to:
   selectively control a component of the communication device to draw current from the power source to selectively increase the minimum level of the time-varying current, wherein the component is configured to perform at least one other function within the communication device.

* * * * *